United States Patent [19]

Allen

[11] 4,193,349
[45] Mar. 18, 1980

[54] TIE DOWN CHAIN LINK UNIVERSAL CONNECTOR FITTING

[75] Inventor: John W. Allen, Sedona, Ariz.

[73] Assignee: Abex Corporation, New York, N.Y.

[21] Appl. No.: 881,522

[22] Filed: Feb. 27, 1978

[51] Int. Cl.² .................. B25B 25/00; B60P 7/08; B61D 3/16; B61D 45/00

[52] U.S. Cl. .................. 410/7; 24/230 R; 59/93; 294/65.5

[58] Field of Search ........ 24/230 R; 105/368 T, 105/473, 477; 294/65.5; 59/93

[56] References Cited

U.S. PATENT DOCUMENTS

| | | | |
|---|---|---|---|
| 1,836,169 | 12/1931 | Humphreys et al. | 59/93 |
| 3,471,193 | 10/1969 | Hayes | 294/65.5 |
| 3,844,228 | 10/1974 | Blunden et al. | 105/368 T |
| 4,022,134 | 5/1977 | Krokos | 105/368 T X |
| 4,044,691 | 8/1977 | Kilgus et al. | 105/368 T |
| 4,049,229 | 9/1977 | Peisner | 105/368 T X |

Primary Examiner—Joseph F. Peters, Jr.
Assistant Examiner—Howard Beltran
Attorney, Agent, or Firm—Robert E. Wagner; Thomas L. Kautz

[57] ABSTRACT

A connector fitting for securing vehicles on transporters is provided by the present invention, including outwardly extending projections or ears which receive a bolt for carrying the end links of a pair of tensioning chains in a manner greatly reducing the wear and stress on both the fitting and chains, caused by movement of the vehicles during transit.

2 Claims, 3 Drawing Figures

U.S. Patent     Mar. 18, 1980     4,193,349
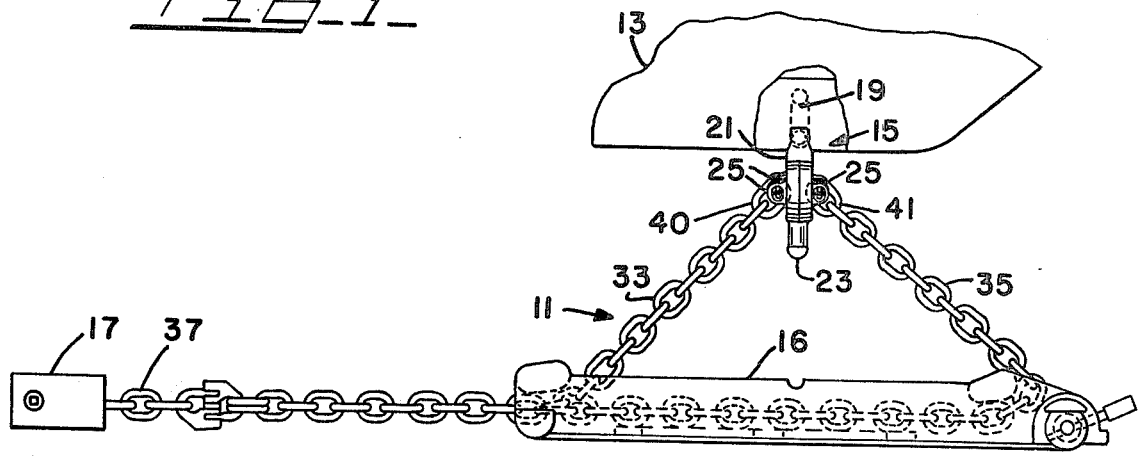
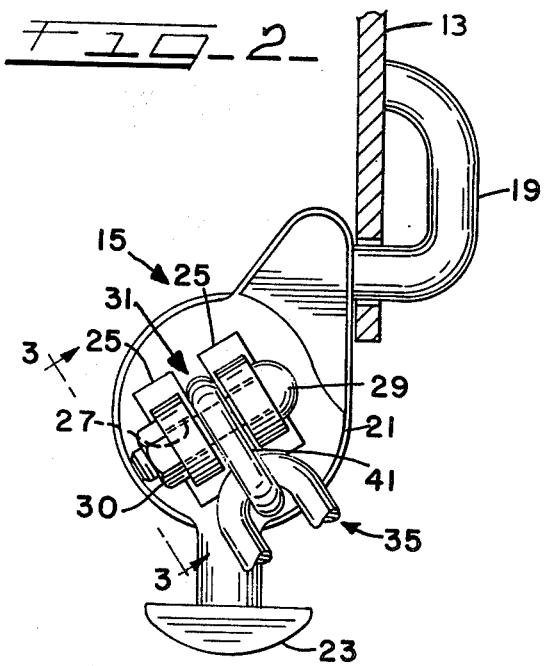
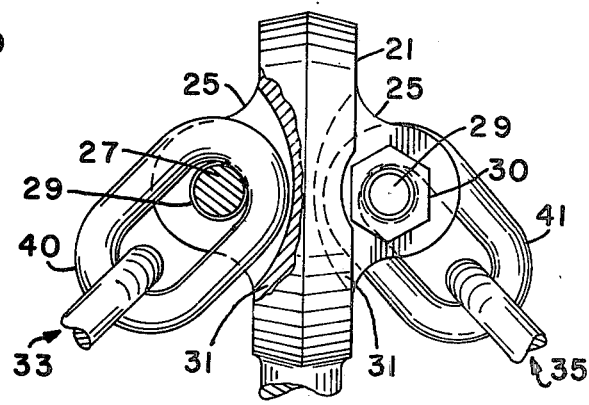

TIE DOWN CHAIN LINK UNIVERSAL CONNECTOR FITTING

BACKGROUND OF THE INVENTION

The present invention relates to fittings for securing articles in a desired position and, more particularly, to a tie-down connector fitting for securing automobiles and the like to the bed of a transporter, such as a railroad car or truck.

Automobiles and other vehicles are normally transported from the factory to a location near the point of purchase by transporters, including trucks and railroad cars. In the past, various means of securing vehicles to such transporters have been used, the most popular method being a tie-down assembly attaching the undercarriage of the vehicle to the bed of the transporter. Generally, prior tie-down assemblies consist of a hook section and a single chain extending therefrom to an idler assembly movable along a track formed in the floor or bed of the transporter to accommodate vehicles of different lengths. In securing a vehicle, the idler assembly is moved along the track to a position beneath the vehicle, where the hook is attached to an opening or slot in the undercarriage of the vehicle. The chain is attached at its free end to a conventional ratchet, movable within the track, which tightens the chain for securing the vehicle to the bed of the transporter for shipment. This procedure was often repeated at each of the four corners of the vehicle as a safety precaution to avoid potentially dangerous and damaging movement of the vehicles should one of the chains break.

In an effort to reduce material and labor costs in tying down vehicles for shipment, shippers have begun to use single tie-down assemblies at the front and rear of the vehicles. Such an arrangement, however, introduces the danger of a loose vehicle on the transporter should one of the chains break. Accordingly, improved vehicle tie-down systems have been developed to safeguard against the possibility of chain failure, such as that disclosed in U.S. Pat. No. 4,022,134 to Krokos, issued May 10, 1977, which shows multiple chains attached to a clevis 41, pivotally pinned to the center of a connector fitting formed in various configurations. A further improvement is shown in patent application Ser. No. 703,594, filed July 8, 1976, now U.S. Pat. No. 4,044,691, issued Aug. 30, 1977, by Donald C. Kilgus and entitled "Vehicle Tie-Down System for Rail Cars".

These improved tie-down systems generally provide a connector fitting which attaches to a pair of chains or at a point along the length of a single chain in a triangular configuration. In such systems, each separate chain or the ends of a single chain are secured to the transporter so that one will hold the vehicle alone, should the other break. It has been discovered in using such tie-down systems, however, that a great deal of stress and strain is placed on the fitting itself, and particularly on the end link of the chain which attaches to the fitting. The tensile and torsion stresses applied to the chains and fitting by the motion of the vehicle on the transporter, especially in starting and stopping, have caused failures in both after relatively short periods of use.

Accordingly, it is desirable to provide a tie-down system wherein the chains may be separated from the fitting should one fail before the other. However, in many prior art designs, such as that disclosed in U.S. Pat. No. 4,049,229 to Peisner, issued Sept. 20, 1977, the chains are integral with the fitting and may not be separated therefrom. In such designs, if either one of the fitting or chains prematurely fail, the entire connector fitting, including the chains, must be replaced.

SUMMARY OF THE INVENTION

The present invention provides an improved means of removably attaching the end chain link to the connector fitting or hook, which greatly increases the life of both the fitting and the chains. The connector fitting of the present invention has opposite ends formed in a known configuration, with a U-shaped portion extending radially outwardly from the body of the fitting on one side and a T-shaped portion extending radially outwardly from the opposite side. The U and T-shaped portions of the connector adapt it for use with both circular and slot openings provided on the undercarriage of different vehicles. A pair of ears are mounted in a spaced relation on either side of the connector body and extend outwardly therefrom.

As discussed more fully below, a bolt is removably inserted through bores formed in the ears on both sides of the connector body, and the tie-down chains are carried by the bolt in a manner greatly reducing the stress on both the connector and end links of the chains. If one of the chains or the fitting should fail prematurely, the bolt can be easily removed to separate the chains from the fitting for replacement of the worn element. The free end of the chains is attached to a conventional ratchet assembly by which tension may be supplied to secure the vehicle to the bed of the transporter.

Therefore, it is an object of this invention to provide an improved connector fitting for use in tie-down assemblies designed to secure automobiles and other vehicles on transporters.

Another object of the present invention is to provide a connector fitting which greatly reduces the stress and wear placed on both the hook engaging the vehicle and the chains during use.

A further object of the present invention is the provision of a connector fitting formed with radially extending projections or ears through which a bolt is removably secured to receive the tie-down chains, in a manner greatly reducing stresses on the fitting and on the chains.

DESCRIPTION OF THE DRAWINGS

Further objects of the invention, together with additional features contributing thereto and advantages accruing therefrom, will be apparent from the following description of one embodiment of the invention when read in conjunction with the accompanying drawings, wherein:

FIG. 1 is a general side elevational view of a tie-down assembly using the connector fitting of this invention, shown attaching to the undercarriage of a vehicle;

FIG. 2 is a side elevational view of the connector fitting of the subject invention, showing the end link of a chain attaching to the fitting; and, FIG. 3 is a partial front view of the connector fitting of this invention as seen generally from a position along line 3—3 of FIG. 2, showing the opposing ears on the connector fitting of the subject invention and the attachment of the end link of a chain therebetween.

DETAILED DESCRIPTION OF THE INVENTION

Referring now to FIG. 1, the vehicle tie-down assembly, labeled generally as 11, is shown in a position beneath a vehicle 13 with a connector fitting 15 having a hook inserted in an opening (not shown) in the vehicle 13. A conventional ratchet 17 and an idler assembly 16 are provided to tension the chains of tie-down assembly 11, which urges the connector 15 downwardly, as discussed below, for securing the vehicle 13 to the bed of a railroad car. The ratchet 17 is of known construction, being movable along a track (not shown) in the bed of the railroad car or truck for adjusting its position beneath vehicles of varying lengths.

Referring now to FIG. 2, the connector fitting 15 is provided with a U-shaped portion 19 extending radially from one side of a connector body 21, and a T-shaped portion 23 extending outwardly from the other side of connector body 21. The U-shaped and T-shaped portions 19 and 23 are adapted to fit into slots or openings provided in the frames or undercarriages of most vehicles. A pair of spaced, outwardly extending ears 25 are formed on opposite sides of connector body 21, as shown in FIG. 3. These ears 25 are formed with aligning circular bores 27 to receive a bolt 29 of slightly smaller diameter for purposes which will be explained below. As also discussed below, an indented radial section or arc 31 is formed on each side of connector body 21 in the space between ears 25.

In use, connector fitting 15 is attached to separate first and second tie-down chains 33 and 35, respectively, as shown in FIG. 1. As mentioned above, it has been found in using many prior art tie-down systems that an undue amount of stress and strain is placed on the connector fitting or hook and particularly on the end links of the chains which attach to that fitting, causing potential failure of both elements after relatively short periods of use. This is often due to the necessity of attaching the end link of the chain in a fixed position on the connector fitting, which allows for little or no give or movement of the connecting link with respect to the fitting. As a result, the end links of the tie-down chains are subject to a major portion of the twisting and tensile forces applied to the connector fitting as the vehicle shifts and sways with the movement of the transporter, particularly in starting and stoppping.

Accordingly, the present invention provides a connecting means which allows the end links of tie-down chains 33 and 35 to move and twist with the connector fitting 15, so that the entire length of the chains absorbs the forces resulting from the vehicle movement rather than just the end links of the chains. As shown in FIGS. 1 and 3, the respective end links 40 and 41 of the tie-down chains 33 and 35 are placed in the space between ears 25, and a bolt 29 is then inserted through the aligning bores 27 formed in each pair of ears 25 on either side of connector body 21, which bolt 29 passes through the end links 40 and 41 of chains 33 and 35 to secure them to connector fitting 15. A nut 30 is threaded on the stem of each bolt 29 to tightly attach it to the ears 25. If the connector fitting 15 or either chain 33 or 35 should fail prematurely, bolt 29 can be easily removed from between ears 25 by loosening nut 30 and then replacing the worn part.

The spacing of the ears 25 on opposite sides of body 21 is sufficient to permit end links 40 and 41 a degree of movement along bolt 29. In addition, the indented radial section 31, formed in between ears 25 on either side of the connector body 21, allows the end links 40 and 41 to freely pivot relative to bolts 29 and the fitting 15, preventing binding contact with connector body 21. This unique design distributes applied forces resulting from vehicle movement more uniformly along the length of chains 33 and 35, and also reduces wear on connector fitting 15 and the end links 40 and 41 of chains 33 and 35.

As shown in FIG. 1, second tie-down chain 35 attaches to bolt 29 on one side of connector fitting 15 and extends downwardly at an angle therefrom to one end of idler assembly 16 of tie-down assembly 11, and then horizontally therealong toward ratchet 17. First tie-down chain 33 attaches from the other side of connector fitting 15 and extends downwardly to idler assembly 16 where it is secured opposite second tie-down chain 35. The resulting triangular configuration formed by first and second tie-down chains 33 and 35 is advantageous because nearly equal stress is placed on both first and second tie-down chains 33 and 35, and, in the event one of the chains should fail, the other will securely hold the connector fitting 15 and vehicle in place alone.

First and second tie-down chains 33 and 35 meet at a point outside of the idler assembly 16, as shown on the left side of FIG. 1, where a third chain 37 is provided to connect them to ratchet 17. As the chains 33 and 35 are tensioned by ratchet 17, they tend to urge connector fitting 15 downwardly, which securely holds the vehicle in place on the railroad car bed or the like.

Accordingly, an improved connector fitting for securing vehicles on tranporters is provided by the present invention, having outwardly extending ears which receive the end links of first and second tie-down chains in a manner greatly reducing the wear and stress on both the connector hook and chains, caused by vehicle movement during transit.

Upon a consideration of the foregoing, it will become obvious to those skilled in the art that various modifications may be made without departing from the invention embodied herein. Therefore, only such limitations should be imposed as are indicated by the spirit and scope of the appended claims.

I claim:

1. A tie-down connector fitting for use in a tie-down assembly including tensioning chains to secure vehicles to the bed of a transporter for shipment, comprising:

a connector body;

attaching means formed on said connector body and removably engageable with said vehicles for securing said connector fitting thereto;

a pair of generally parallel spaced ears disposed on opposite sides of said connector body and extending outwardly therefrom, each pair of said spaced ears having aligning, generally central bores formed therethrough;

an idented radial portion formed in said connector body in between said spaced ears; and, bolts insertable through said aligning central bores of each of said spaced ears, and through an end link of said tensioning chains between said spaced ears adjacent said indented radial portion to secure said end links for rotation and lateral movement about said bolts, said end link of said tensioning chains being movable laterally along said bolts and being pivotal relative to said connector body within said indented radial portion formed therein for substantially reducing the stresses placed on said end links of said tensioning chains during shipment of vehicles to prolong the useful life thereof.

2. In a vehicle tie-down system for securing vehicles to the bed of a transporter, including an idler assembly movable along the bed of said transporter beneath a vehicle, ratchet means movable on said transporter bed, and tensioning chains connecting said idler assembly and said ratchet means, said idler assembly and said ratchet means cooperating to tension said tensioning chains, the improvement comprising:

a connector fitting including a connector body, attaching means formed on said connector body and removably engageable with said vehicle for securing said connector fitting thereto, a pair of generally parallel spaced ears disposed on opposite sides of said connector body and extending outwardly therefrom, each pair of said spaced ears having aligning, generally central bores formed therethrough;

an indented radial portion formed in said connector body in between said spaced ears; and, bolts insertable through said aligning central bores of each of said spaced ears, and through an end link of said tensioning chains between said spaced ears adjacent said indented radial portion to secure said end links for rotation and lateral movement about said bolts, said end link of said tensioning chains being movable laterally along said bolts and being pivotal relative to said connector body within said indented radial portion formed therein for substantially reducing the stresses placed on said end links of said tensioning chains during shipment of vehicles to prolong the useful life thereof.

* * * * *